United States Patent

[11] 3,597,623

| [72] | Inventor | Carlo Gilardi<br>24, via Carlo Boni, Milan, Italy |
|---|---|---|
| [21] | Appl. No. | 793,649 |
| [22] | Filed | Jan. 24, 1969 |
| [45] | Patented | Aug. 3, 1971 |
| [73] | Assignee | Mosa S. r. l.<br>Milan, Italy |
| [32] | Priority | Jan. 27, 1968 |
| [33] | | Italy |
| [31] | | 12075A/68 |

[54] POWER PLANT AND GENERATING UNIT
5 Claims, 8 Drawing Figs.

[52] U.S. Cl. ............................................. 290/40,
322/90, 290/1
[51] Int. Cl. ............................................. H02p 9/04
[50] Field of Search ............................................. 290/40, 1
A; 322/90

[56] References Cited
UNITED STATES PATENTS
| 2,508,719 | 5/1950 | Kern | 290/40 X |
| 1,720,208 | 7/1929 | Collins | 290/33 |
| 2,976,424 | 3/1961 | Anderson | 290/40 X |
| 3,029,378 | 4/1962 | Carlsson | 322/90 |
| 3,070,705 | 12/1962 | Forss et al. | 290/40 |
| 3,098,191 | 7/1963 | Cavert et al. | 290/40 X |
| 3,098,935 | 7/1963 | Summers | 290/40 |
| 3,377,486 | 4/1968 | Benezech | 322/90 |

*Primary Examiner*—G. R. Simmons
*Attorney*—Michael S. Striker

ABSTRACT: An electric generating set adapted for supplying current to an intermittently current consuming device such as an arc welder device. The set comprises an internal combustion motor, a speed governor to govern said motor at a given service speed, a generator driven by the motor and having a power output, and output sensing and actuator devices influencing said speed governor and set the motor at a lower idle speed when no current is withdrawn from the generator.

INVENTOR.
CARLO GILARDI
BY Michael S. Striker
Attorney

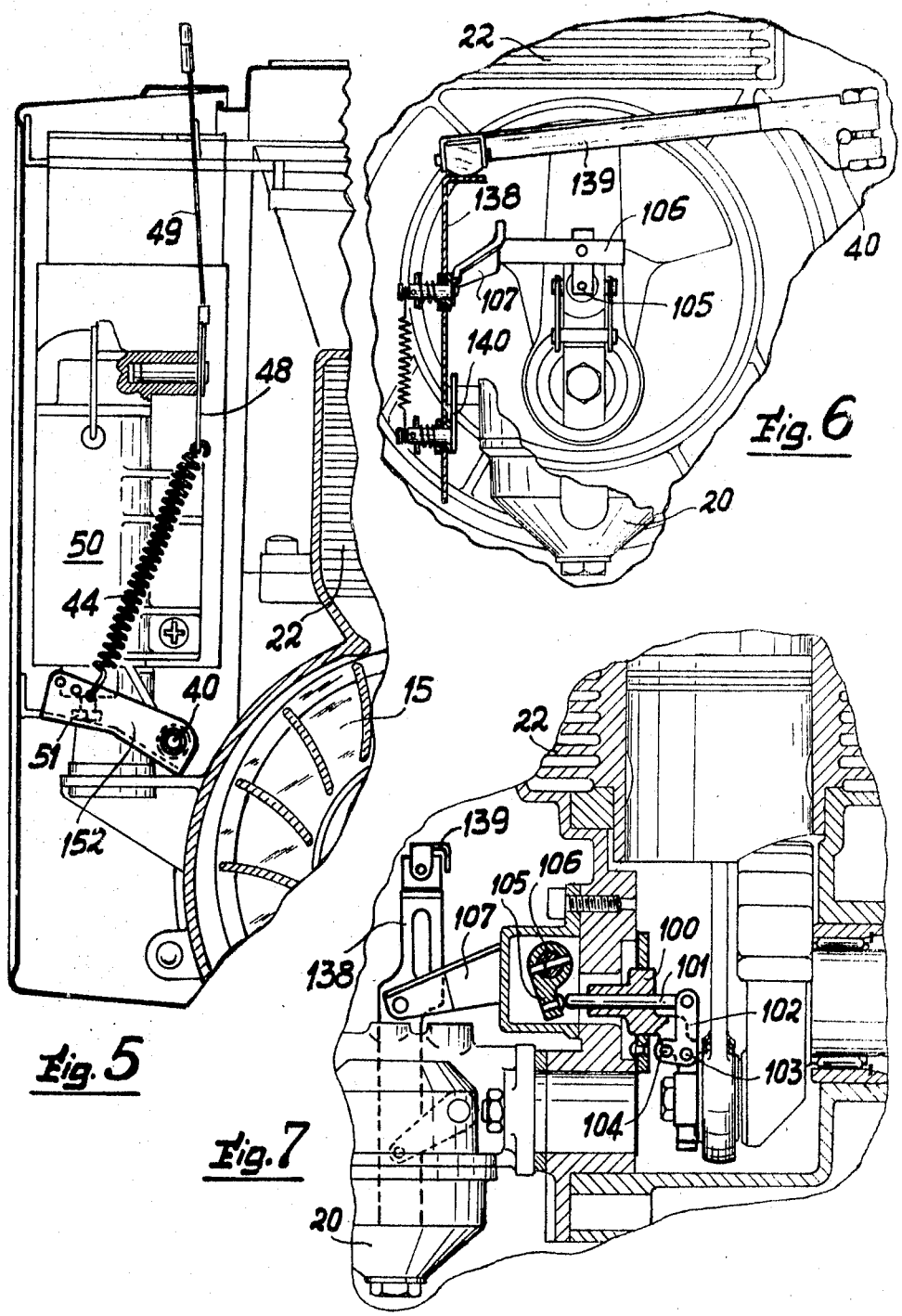

3,597,623

POWER PLANT AND GENERATING UNIT

BACKGROUND OF THE INVENTION

This invention generally relates to electric generating sets and, more particularly, it is concerned with an improved lightweight and portable plant or unit comprising an internal combustion motor, particularly a gasoline motor, and a current generator more particularly an AC generator. The improved unit of the invention is prevailingly but not exclusively designed for supplying an arc welding device. It is however adapted for supplying any of a plurality of electric current supplied devices, particularly where an abruptly intermittent request of current is promoted by the operation of the current consuming device. Arc welding devices are typically representative of those devices wherein the current absorption is abruptly and repeatedly interrupted, the invention will be hereinbelow described and discussed as applied to the field of generating set for supplying said devices.

It is known that the art of gasoline electric generating sets is a well advanced one. Portable lightweight sets are provided with small but powerful internal combustion engines working at several thousands revolution per minute, such as from 7,000 to 9,000 r.p.m; the engine is generally directly coupled to a high frequency AC generator adapted for arc welding. In most occurrences wherein portable lightweight generating sets are actually used, arc welding operations include a sequence of relatively short current withdrawal periods, such as from few seconds to few minutes, spaced by "no-load" periods of extremely variable time, sometimes of several minutes.

The internal combustion motor is currently provided with a speed governor which can be adjusted for establishing the speed of motor at the desired service r.p.m; irrespective of the load. Conventionally, the speed governor acts on the carburetor of the engine, for adjustably throttling same at the desired r.p.m. for service. The above simple combination of means maintaining the motor at a constant service speed even when running idle, that is when no load is applied to the prime power supply. Very high idling, if maintained for a discrete and in particular a pretty long time, is of serious prejudice for the internal combustion engine, in particular when the motor has been designed for encountering relatively short and spaced peaks of load.

For ensuring proper and long service of the set it is therefore desirable that the motor would be throttled down to a markedly lower speed when running idle, at least when no load is applied thereto for more than very few seconds. Several means have been heretofore proposed for meeting such conditions, in addition to or more particularly instead of having the motor attended by an assistant. Such known means generally comprise remote control means which can be operated by the welder operator. Such remote control means require further connections between the arc welding device and the current supply set. In addition, if such remote control is responsive to the arc welder operator's action, the attention payed by the operator to welding could be disturbed. It is known that arc welding is an operation which requires skill and concentration, and which is many times performed in hazardous locations, such as aloft on high pylons and other iron structures, bridges and so on.

It is therefore a principle object of this invention to provide a new and improved portable power plant and generator unit which is not subject to the above and other objections.

THE INVENTION

According to the invention, the new unit or set comprises an internal combustion engine, a generator coupled to and driven thereby a speed governor adapted for maintaining the engine at its load meeting service speed, governor deactivating means actuable for transiently making the governor ineffective and throttling down the engine to a lower idle speed, actuator means to actuate said governor deactivating means, a load responsive device connected to the output of the generator for sensing load variation at said output and providing a signal representative of substantial load variations, and signal controlled means for causing said actuator to activate and deactivate the governor when a load is sensed and respectively not sensed at the generator output.

Preferably, the speed governor is biased by a spring adjusted for governing the motor at the service r.p.m. and the governor deactivating means comprises means designed for transiently removing the bias from the governor.

According to another preferred feature of the invention, the said actuator consists of an electromagnetical operating device, such as a solenoid having a movable core or plunger positioned to act on the governor biasing spring.

According to a further preferred feature of the invention, the internal combustion engine comprises a spark ignition system comprising a spark providing coil and a current generating coil. Such system preferably consists of a conventional motorcycle ignition flywheel magneto (wherein the current generating coil is connected to supply the motorcycle lighting means). The said current generating coil is connected to the electromagnetic actuator via signal actuate switch means.

These and other objects and features of the invention will be made more clearly apparent from following detailed description of preferred embodiments of this invention, when taken in conjunction the accompanying drawings, forming an essential component of this disclosure.

THE DRAWINGS

Figure 4:
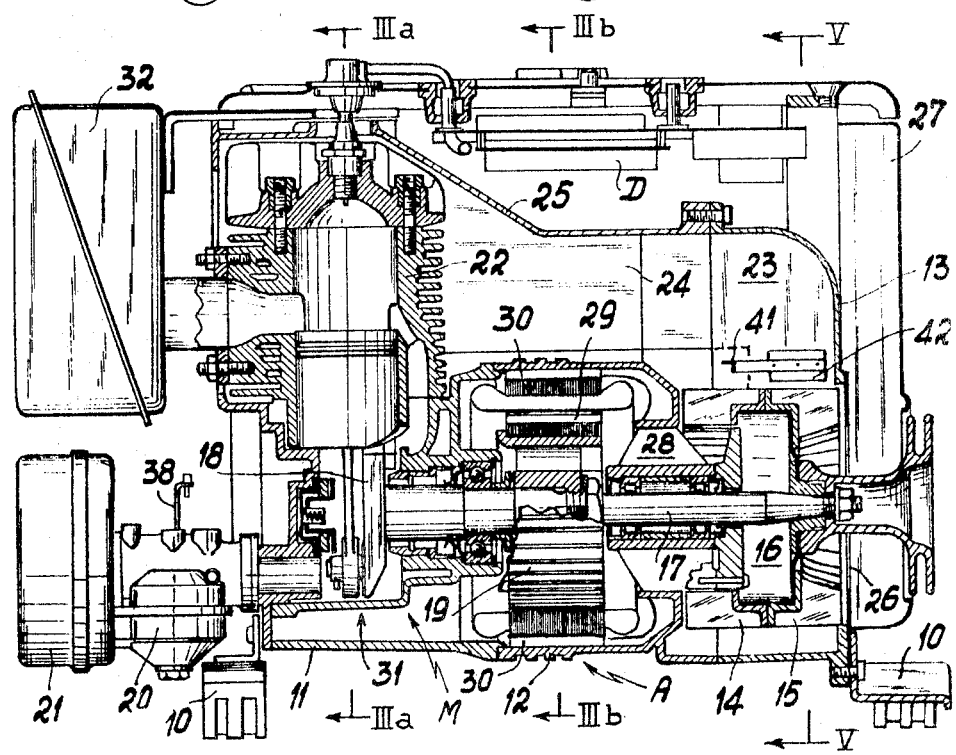
FIG. 4, is a longitudinal sectional view of the unit, some components of which being shown in side elevation.
Figure 8:
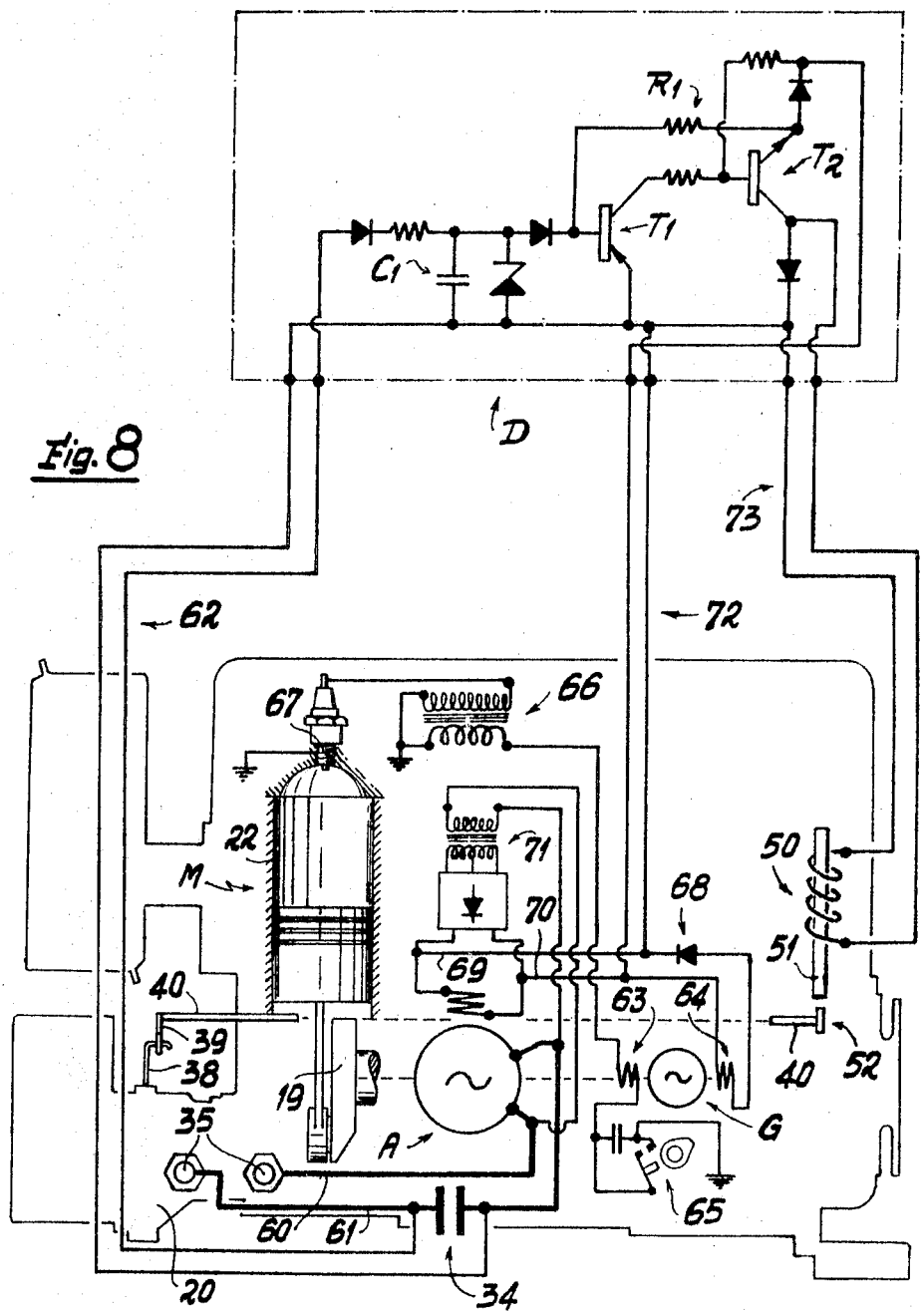

FIG. 5 fragmentarily illustrates in greater detail some components as seen from the plane and in the direction indicated at V–V in FIG. 4;

FIG. 6 illustrates in detail some components of the linking of actuator to the carburetor throttle means;

FIG. 7 is a longitudinal sectional view illustrating a preferred construction of the speed governor; and FIG. 8 diagrammatically illustrates the electrical means and wiring of the unit.

Like reference numerals refer to like parts and components throughout the several figures, except where otherwise indicated.

DETAILED DESCRIPTION OF THE PREFERRED EMBODIMENTS

Referring first to FIGS. 1 to 4 inclusive: there is shown a structurally unitary portable plant generally including an internal combustion motor generally indicated at $M$ and an AC generator generally indicated at $A$. Such essential components are rather detailedly illustrated in the drawings and are of conventional construction, when individually considered. A further detailed description thereof is therefore unnecessary for full understanding of the invention.

The unitary structure of the unit, provided with suitable shock and vibration absorbing supports 10, comprises the outer motor casing 11, the outer casing 12 of the generator and a casing 13 wherein the air cooling system for the motor is housed, which comprises two coaxial oppositely located fans 14 and 15. A space 16 is formed between and within said fans and a quite conventional motorcycle-type magnetoflywheel is located in said space and driven by left end portion of the unitary motor and generator shaft 17. Said magnetoflywheel is not shown in FIG. 4, for simplicity sake. When individually considered, the construction, arrangement and drive of such magnetoflywheel are well known in the art. Its essential electric components are shown in FIG. 8, wherein the magnetoflywheel is generally indicated at G.

The said shaft 17 is secured to or preferably integrally formed with the crank 18 of the motor, and the rotor 19 of the generator is keyed or otherwise secured to said shaft 17. The finned cylinder of the motor is generally indicated at 22. The motor is provided with a conventional carburetor 20 the air intake of which is preferably provided with an air filter 21.

Figure 1:
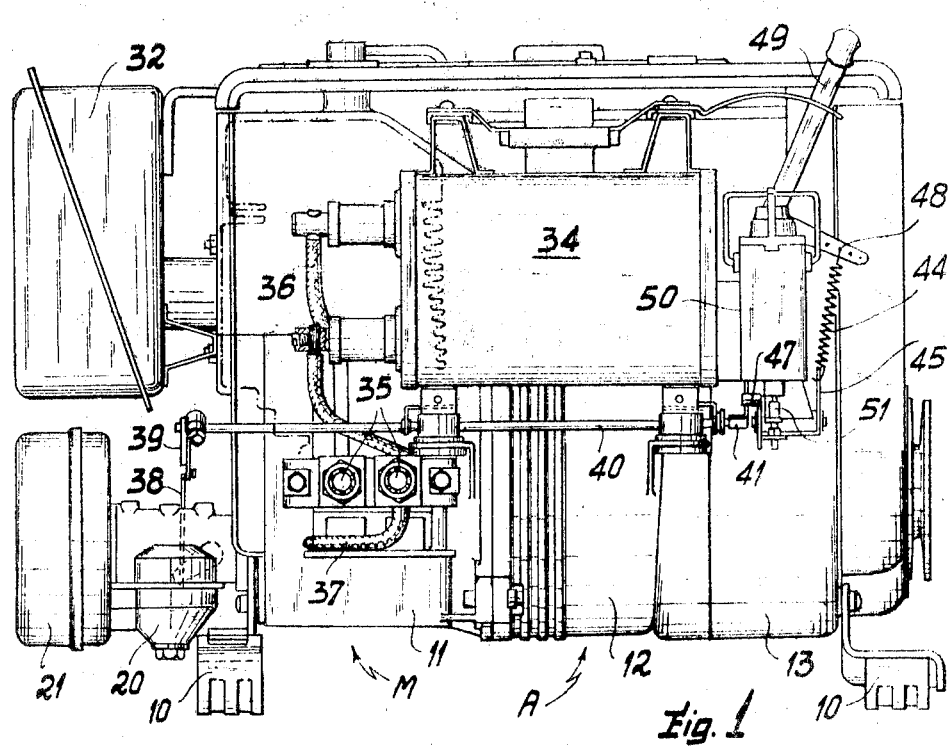
FIG. 1 is a side view of the improved unit.
Figure 2:
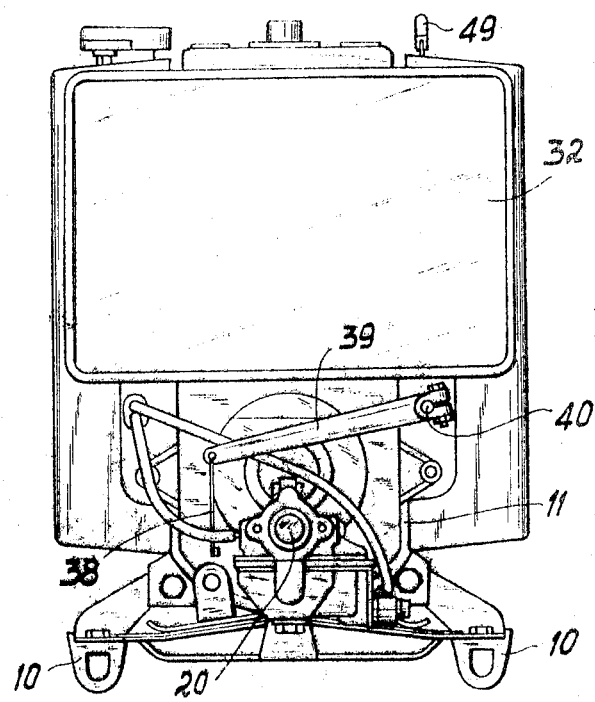
FIG. 2 is an end view of same unit, as seen from its end wherein the carburetor is located, the air filter being omitted in the showing.
Figure 3:
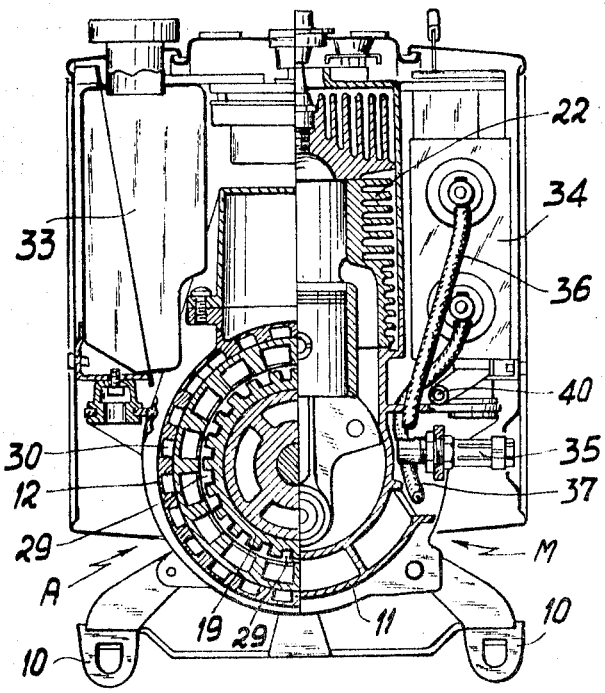
FIG. 3 is a cross-sectional view, wherein the left and the right half portion of the figure have been taken in the planes indicated at IIIa–IIIa and respectively at IIIb–IIIb of FIG. 4.

Said finned cylinder 22 is cooled by an air current of flow provided by fans 14 and 15 guided along ducts 23 and 24, such latter duct being formed within an upper casing 25. The fan 15 has its air intake at a passage 26 formed into an outer casing 27, so that the sucked air cools the electrical and electronical components of the unit, which are housed within a boxlike casing generally indicated at D in FIGS. 4 and 8. The fan 14 has its air intake at passage 28 formed about a shaft bearing and sucks air through passages 29 and 30 formed in the generator rotor and stator, respectively, for cooling the generator, and the lower surface 31 of the motor crank casing. The unit is further conventionally provided with a muffler 32, a fuel tank 33 (FIG. 3).

The power electric components, more detailedly discussed below, comprise, according to the art, a power factor correction condenser 34 and power output terminals 35 (FIGS. 1, 3 and 8) and cables 36 and 37.

The throttle valve (not shown) of the carburetor is connected to a link 38 which, by means of a lever 39, is at its turn connected to a shaft 40 on which the actuator act for deactivating the speed governor, as described below. Such speed governor can comprise a brace 41 (FIGS. 1 and 4) secured to a van 42 located in the airflow produced by fans 14 and 15, and therefore subjected to a force proportional to the motor speed.

Preferably, the speed governor is constructed and connected to the carburetor throttle as shown in FIGS. 6 and 7. A bushing 100 is secured to the motor crankcase coaxially to the crankshaft and bored for slidably supporting a rod or pin 101 in the axis of said shaft. The inner end of pin 101 is pivotally connected to a pair of bellcrank levers 102 pivoted at 103 to the motor crank and having a weighting mass or counterweight body secured at 104, spaced form said axis, so that said pin 101 will be outwardly (leftwardly, in the showing of FIG. 7) urged by a force proportional to the r.p.m of the motor.

The outer end of pin 101 abuts on a brace 105 secured to a shaft 106, which is in turn secured to a lever 107 acting on the link 138 pivotally connected to the lever 140 connected to the conventional throttle valve of the carburetor 20. An arm 139 acts also on the link 138, said arm being secured to shaft 40 on which the speed governor biasing spring acts.

The biasing spring consists of a spring 44 (FIGS. 1 and 5) having one end secured to a lever 48 connected to a handle lever 49, by means of which the load of the spring can be adjusted for setting the speed governor for differing service r.p.m.; the other end of spring 44 is connected to a lever 152 (FIG. 5) or to a leverage 45, 47 (FIG. 1), which is connected to said shaft 40.

A solenoid 50 having a stationary coil and a plunger core 51 is positioned for acting on said lever 152 or on said leverage 45, 47 when energized, and powered for overcoming the biasing force of spring 44, while, when the solenoid is not energized, the motion and the action of the biasing spring 44 is not disturbed.

Therefore, assuming that the unit is running in its regular service and the solenoid 50 is not energized, the motor speed will be conventionally governed by the speed governor at the desired r.p.m., adjusted by adjustment of the biasing force, that is upon setting of handle lever 49. The r.p.m. valve is determined by the balance between the biasing force of spring 44 and the force applied by the speed governor, that is the centrifugal force applied to counterweight 104 (or the dragging force applied to vane 41, FIGS. 1 and 4). The force exerted by the speed governor tends to choke the carburetor intake, so that as the r.p.m. value increases, the governor throttles down the engine for establishing the speed of the motor. Such mode of operation is quite conventional.

Assuming now that the solenoid 50 will be energized, its plunger 51 will act so that it overcomes the force of biasing spring 44 and, therefore, the speed governor will be no more counteracted by the spring and will further choke the carburetor for slowing down the motor. In view of the fact that lightweight high speed motors of the type considered run idle at pretty high r.p.m. (such as at 3,000 or more r.p.m.), the governor is adjusted for stabilizing the motor speed at the most desirable idle speed, when not biased by spring 44.

The new unit comprises means for energizing the solenoid 50 when no substantial electrical load appears to be applied between its power output terminals 35. Such means will be now described with reference to FIG. 8, wherein the spring biased component has been diagrammatically indicated at 52.

The power output circuit of generator A comprises leads 60 and 61, the said power factor correction condenser 34 being connected in lead 61. The load sensing circuit comprises conductors 62 connected at either sides of condenser 34 and leading to a an electronic trigger and switching unit contained in said box D.

The generator G of the spark ignition system for motor M (such as a well-known magnetoflywheel) comprises two generating coils 63 and 64. Coil 63 provides the ignition of spark plug 67 by means of conventional contact breaker means 65 and ignition coil 66. The other coil 64, providing an AC rectified by a solid state rectifier 68, is connected to a circuit 72 through which it can energize the actuator solenoid 50.

In addition, same coil 64 is used for ensuring starting excitation for AC power generator A, via leads 69 and 70. When started, the power generator is self-excited by a known excitation circuit 71 fed by the power output.

The load sensing and switching unit in D comprises means which, when no load is sensed between output terminals 35, connects the output 72 from coil 64 to the energizing circuit 73 of solenoid 50 while, when a substantial electric load is sensed, said connection is interrupted. The signal is provided by a current or by a difference of potential sensed from the power output. In addition, the unit comprises means providing a time constant for delaying energization of the solenoid for given time, such as 1 or few seconds, when no load is sensed, whereby the motor will not be slowed down when the power circuit is briefly interrupted, such as during brief interruption of the welding arc, for maintaining the motor at its service r.p.m. value.

The said unit, as individually considered, is produced according to the current well worked out art of electronics and control circuits, and the showing of FIG. 8 is given only by way of example. The switching means for circuit 72, 73 comprise a transistor $T_2$ the conductivity of which is controlled by the output of a signal responsive transistor $T_1$, the control being subjected by a delayed circuit including at least a resistor $R_1$ and a capacitor $C_1$. Of course, the circuits and the electric and electronic components of the unit can be differently choosen and arranged according to the various requirements, such as of amplification of the available signal and so on.

In addition, generator units according to the invention can be usefully adapted for supplying electric driven machine tools, in particular for outdoor service, and other current consuming apparatuses, in particular subject to intermittent service wherein the load applied to the supply generator is frequently and abruptly removed and restored.

While some concrete forms of the invention have been described it is to be understood that the invention may undergo many modifications within the gist and spirit of the following patent claims.

I claim:

1. An improved portable plant for supplying electrical energy to an intermittently consuming current apparatus, said plant comprising an internal combustion engine comprising a spark ignition system including a generator having a first current producing coil connected for providing spark ignition and a second current producing coil, said engine being provided with a speed adjusting throttle means and speed governor means sensitive to the speed of the engine and biased by spring means tending to throttle the engine to maintain the engine speed at a given service speed upon actuation of said throttle means; and a main current generator connected to said engine to be driven thereby and having a power output connectable to said intermittently current consuming apparatus, wherein the improvement comprises output sensing means producing a signal indicative of substantial presence or absence of an electrical load at said power output; a speed governor bias relieving means for setting said governor to govern and maintain said engine at a low idle speed; a signal responsive actuator arranged for actuating said governor bias relieving means when a signal indicative of substantial absence of an electrical load at said power output is sensed, said actuator comprising an electromagnetic device having coil means connected to said second coil to be energized thereby and a movable core forming part of said bias relieving means and arranged for relieving the application of the spring force on said speed governor upon energization of said electromagnetic device; and signal responsive switching means connected between said second coil and said device.

2. The improved plant claim 11, control time delaying means connected between said signal producing means and said signal responsive actuator to delay actuation of said actuator for a given time after production of a signal indicative of substantial absence of an electrical load.

3. The improved plant of claim 1, wherein said switching means comprises a transistor connected for terminating current from said second coil to said electromagnetic device upon application of an amplified output indicative signal thereto.

4. The improved plant of claim 1, comprising current rectifying means connected between said second current producing coil and the coil means of said electromagnetic device.

5. The improved plant of claim 1, wherein the output circuit of said main generator comprises a power factor correction condenser and said output sensing means comprise a circuit connected at either sides of said condenser.